United States Patent [19]

Dath et al.

[11] Patent Number: 5,618,770
[45] Date of Patent: Apr. 8, 1997

[54] PROCESS FOR THE PRODUCTION OF POWDER CATALYSTS

[75] Inventors: Jean-Pierre Dath, Beloeil; Guy Debras, Bons-Villers, both of Belgium

[73] Assignee: Fina Research, S.A., Feluy, Belgium

[21] Appl. No.: 341,824

[22] Filed: Nov. 18, 1994

[30] Foreign Application Priority Data

Nov. 18, 1993 [BE] Belgium ............... 09301272

[51] Int. Cl.$^6$ .................. C08F 4/62; C08F 4/04
[52] U.S. Cl. .................. 502/107; 502/8; 502/9; 502/115; 423/DIG. 10; 437/446; 437/455
[58] Field of Search .................. 502/104, 115, 502/8, 9, 107; 423/DIG. 10; 315/111.21; 427/446, 455, 561, 212

[56] References Cited

U.S. PATENT DOCUMENTS 4,650,778  3/1987  Klabunde et al. ............... 502/8
4,740,570  4/1988  Klabunde et al. ............... 502/8

FOREIGN PATENT DOCUMENTS 1005737   5/1992  Belgium .
12799208  3/1980  United Kingdom .

*Primary Examiner*—Glenn Caldarola
*Attorney, Agent, or Firm*—William D. Jackson; Jim D. Wheelington; M. Norwood Cheairs

[57] ABSTRACT

Magnesium chloride, titanium chloride and at least an electron donor are introduced in a plasma torch. These chlorides being in solution or in suspension in a liquid that can be an electron donor. A very fine granulometry powder is collected after cooling. The powder is very fine, it has a controlled morphology and it can be used as catalyst for alpha-olefins polymerization.

11 Claims, No Drawings

PROCESS FOR THE PRODUCTION OF POWDER CATALYSTS

BACKGROUND OF THE INVENTION

Magnesium chloride ($MgCl_2$) powder covered with titanium chloride ($TiCl_3$, $TiCl_4$) is an original material well-known as Ziegler-Natta type catalysts. The yield of these catalysts depends among other things on the particle size of the original material; the finer the particles are, the higher the yield is. There is thus a need for an improved process for the production of catalyst powders, more particularly of $MgCl_2$ powder covered with titanium chloride that allows to obtain a very fine granulometry. In fact, it is particularly difficult to obtain a very fine granulometry powder by pulverizing $MgCl_2$ under anhydrous conditions, although this fineness is desired when $MgCl_2$ is used in the catalysts preparation.

The morphology of polymer grains—and consequently, the polymer apparent density—is among other things determined by the catalyst morphology. It is then very desirable to be able to control the morphology of the catalyst powder that is ideally spherical.

Patent GB-1279208-A (Standard Telephones; equivalent to DE-22 17951-A, Deutsche ITT ) discloses a process of powder production consisting in vaporizing the material or its components in an inductive coupling plasma (ICP) then in condensing the vapor.

U.S. Pat. No. 4650778-A (Klabunde et al.) shows a process for the preparation of halogen metal particles consisting in vaporizing them by heating, then in condensing the vapor in the presence of a reactive diluent. The obtained solid must be activated by metal alkyls to be used as catalysts of olefin polymerizations.

Belgian Patent BE-1005737-A (filed on Aug. 5, 1992 and published on Nov. 1, 1994) claims a process for the production of magnesium powder, characterized in that it consists essentially in introducing rough powder of magnesium chloride, with or without titanium chloride in a plasma torch and cooling the vapor in order to collect a very fine granulometry powder, eventually by covering this powder with an electron donor during the cooling.

An object of the present invention is to provide an improved process for the production of powder Catalysts comprising $MgCl_2$ and titanium chloride and having a very fine granulometry.

Another object of the invention is to provide an improved process for the production of powder catalysts comprising $MgCl_2$ and titanium chloride and having a controlled morphology.

Another object of the invention is to supply a powder catalyst comprising $MgCl_2$ and titanium chloride, having a very fine granulometry and having a controlled morphology.

Another object of the present invention is to provide an improved olefins polymerization process that uses as a catalyst a $MgCl_2$ titanium chloride based powder obtained according to the invention.

DESCRIPTION OF INVENTION

The process of the invention essentially consists in the introduction into a plasma torch (i) of magnesium chloride, (ii) of titanium chloride and (iii) at least one electron donor, the magnesium chloride being in solution or in suspension in a liquid L1, the titanium chloride being in solution or in suspension in a liquid L2 or being liquid $TiCl_4$, the electron donor being L1 and/or L2 and/or another liquid compound or in solution or in suspension in a liquid, and to collect a powder after cooling.

Although the obtained powder is described here as a $MgCl_2$ and titanium chloride based powder, it is understood in these terms the powder which results from the process and without the intention to make a connection, it is thought to be composed of $MgCl_2$ covered with titanium chloride. In the same way, while the magnesium and titanium compounds are described as chlorides, the use of which is preferred, it is understood that these chlorides can be partially (preferably to less than 50% in moles, even to less than 25 mol %) replaced by alcoholates (preferably with short chain, the most preferred being methanolate and ethanolate).

A plasma torch is preferably used but any different plasma can also be used in which $MgCl_2$, titanium chloride and the electron donor can be introduced in the form of a liquid, of a suspension or of a solution and when a very fine granulometry powder can be recovered after cooling. The plasma used can be maintained by direct current discharge, radio-frequency, micro-wave, . . . . It can concern a plasma generated by inductive coupling (ICP).

According to a preferred embodiment, a solution containing the $MgCl_2$ and the titanium chloride is used, which can be obtained by the introduction of rough $MgCl_2$ powder in an appropriate solvent and after that by the addition of titanium chloride. As appropriate solvents, preferably those that allow to dissolve large quantities of $MgCl_2$ (at least 1 g/l and preferably at least 10 g/l) and titanium chloride are chosen. For example, tetrahydrofuran and alcohols such as ethanol or methanol can be used. Methanol is preferably used. According to another embodiment, a suspension of the two components in a liquid is used. According to a third embodiment, a suspension of one of the components in a solution of the other is used. According to these three embodiments, it is preferred to use the electron donor as solvent or as liquid.

Although it does not concern a preferred embodiment of the present invention, one can also introduce separately into the plasma the different required components: for example a suspension or a solution of $MgCl_2$ at the same time as a suspension or a solution of titanium chloride or liquid $TiCl_4$, the electron donor being one of these two solvents or liquids, being added to one of these two solutions or suspensions or being introduced separately in liquid, dissolved or suspended form.

The electron donors are well-known in the art of the Ziegler-Natta catalysis, and it is not necessary to describe it here. As examples of electron donors, ethers, preferably cyclic ethers (the most preferred being tetrahydrofuran), alcohols (the most preferred being methanol and ethanol), benzoates (particularly ethyl benzoate) and phthalates (particularly dibutyl phthalate) can be quoted.

Every suspension or solution or liquid may be introduced in the plasma by every appropriate means, preferably in an inert carrier gas flow such as nitrogen and/or argon. Generally, the suspension or the solution, compressed by an inert gas or by mechanical means, is admitted at the plasma level with aid of a capillary, a capillary system or a pulverization device. The solution flow is provided by an injection and/or a pulverization system, at a value dependent on the plasma generator power (the higher the power is high).

Without intention to make a connection with any theory, it is possible to say that when a solution or a suspension is injected in the plasma, the energy of the plasma induces instantaneous evaporation of the solvent or the liquid, respectively. The solid obtained consequently to the evaporation of the solvent is pulverized in form of micro-droplets; these under enormous temperature gradient undergo quenching that does not allow any subsequent recrystallization of the solid. This quenching can be amplified by addition to the mechanism of cold surfaces on which the micro-droplets can condensate.

Again, without intention to make a connection with any theory, it is assumed that good results are only obtained with the presence of an electron donor during the vaporization of magnesium chloride and/or titanium chloride. Consequently, the plasma energy must preferably be adjusted in order to avoid the degradation of the electron donor (that could by the way lead to the formation of carbonaceous residues undesirable in a catalyst of olefin polymerizations). A particular advantage is the constancy and the conservation of the ratio Mg/Ti (very important for a catalyst of olefin polymerization) through the plasma, which represents an unexpected advantage compared to usual processes (and for example compared to patent U.S. Pat. No. 4650778 in which this ratio isn't controllable).

The process can be reactive or not, depending if the chemical sorts present in the plasma are able to react together or not. In this way, the liquid used for dissolving the titanium and magnesium components or for suspending them can eventually react with them. In the same way, hydrogen can be introduced in the plasma in order to reduce the titanium compound.

The different parameters are adjusted, particularly the plasma temperature, the residence time of the plasma, the solution, suspension and/or liquid flows, the plasma gas and/or carrier gas flows, in the way to obtain the finest possible granulometry and/or the optimal morphology. The continuous process is preferably used.

The particles obtained by the process of the invention have a very fine granulometry; they are collected by any appropriate means for the collection of fine particles, generally by means of a cyclone, by deposit on cool surfaces of a quenching system and/or by a filtration of cooled carrier gas flow. For several uses, and particularly when original material for Ziegler-Natta type catalysts are concerned, the very fine powder has to be conserved free from humidity, and it is then generally immersed in a solvent such as heptane.

According to an embodiment of the invention, a second electron donor can be vaporized separately (i.e. outside of the plasma used for the catalyst preparation process) and this vapor can be brought into contact with the very fine granulometry powder during its cooling, in a way to cover this powder with electron donor.

The present invention also provides a process for the polymerization of alpha-olefins having from 2 to 20 carbon atoms, preferably from 2 to 8 carbon atoms, preferably ethylene, characterized in that this polymerization is carried out in presence of a catalyst which was prepared according to the present invention.

The Applicant has found that when the polymerization of alpha-olefins is carried out in presence of a catalyst prepared according to present invention, polyolefins in spherical particles form are obtained. This represents an advantage particularly important because it allows to transform directly the obtained polymer into final product without proceeding the intermediate stage of granulation.

The invention is now illustrated with aid of the following example, which is not intended to limit the invention in any manner.

EXAMPLE I

A. Preparation of the $MgCl_2$ and $TiCl_4$ solution

A stainless steel container containing 200 $cm^3$ of methanol is used and it is maintained under pressure of nitrogen. 18 g of commercial anhydride magnesium chloride in powder of a granulometry comprised between 0.04 and 0.25 mm is dissolved progressively. The obtained solution is cooled and 5 $cm^3$ of titanium tetrachloride is added slowly by means of a syringe.

B. Preparation of the Powder

A continuous flow plasma torch developing a current of 375 A under tension of 50 V is used. The gas supplying the plasma is a mixture of argon and nitrogen. The inlet flows are of 15 l/min and of 17 l/min for nitrogen and for argon, respectively. The container mentioned above is relayed by means of a capillary at the output of the torch in such a way that the solution is introduced in the most hot region of the plasma. The solution flow is controlled by a micro-valve and is maintained at a value of 1600 $cm^3$/h. The capillary oriented perpendicularly to the plasma torch, is surrounded with a tube through which nitrogen is injected, the nitrogen allows at the same time to avoid any overheating of the capillary and to guide the solution through the plasma. The $MgCl_2$ powder covered with $TiCl_4$ is collected on a wall; the powder granulometry obtained in this way is comprised between 0.005 and 0.2 mm. The atomic ratio Mg/Ti is 4.

C. Polymerization

An amount of 100 mg of catalyst obtained following the points A and B here above is pre-contacted during 5 minutes at 100° C. with 2 $cm^3$ of triethyl aluminum (TEAL) in 10% by weight solution of hexane.

The conditions of polymerization are as follows:

diluent isobutane: (3 liters)

temperature of polymerization: 90° C.

ethylene concentration: 6% by weight hexene concentration: 0.4% by weight hydrogen: 15 Nl At first isobutane and 1 $cm^3$ of TEAL (in a solution of 10% by weight in hexane) are introduced in the polymerization reactor of 6 liters. Then the pre-contacted catalyst and again 1 $cm^3$ of TEAL solution as co-catalyst, then hydrogen and finally ethylene and hexene are introduced. The polymerization is carried out during 1 hour.

The characteristics of the obtained polymer are as follows:

yield: 321.5 g productivity: 3215 g/g.h $MI_2$: 1.3 g/10'

HLMI: 38.88 g/10' d: 0.9562 g/$cm^3$ apparent density: 0.257 g/$cm^3$ $MI_2$ ("Melt Index") measured according to the norm ASTM-D-1238-89 (190° C., 2.16 kg);

HLMI ("High Load Melt Index") measured according to the norm ASTM-D-1238-89 (190° C., 21.6 kg); and d (density) measured according to the norm ASTM-D-1505-85.

We claim:

1. In a process for the production of a magnesium chloride and titanium chloride based powder catalyst comprising the steps:

(a) providing a plasma field;

(b) introducing into said plasma field, magnesium chloride in solution or in suspension in a liquid medium;

(c) introducing into said plasma field a liquid medium containing titanium chloride selected from the group consisting of (i) a liquid solution or suspension of a solid titanium chloride and (ii) liquid titanium tetrachloride;

(d) introducing an electron donor into said plasma field; and (e) withdrawing a reaction product of said electron donor, magnesium chloride and titanium chloride from said plasma field, cooling said reaction product and collecting a magnesium chloride and titanium chloride based powder catalyst after cooling of said reaction product.

2. The process of claim 1, wherein the magnesium chloride and the titanium chloride are in solution in the electron donor.

3. The process of claim 1, wherein the electron donor is an ether.

4. The process according to claim 3, wherein the electron donor is a cyclic ether.

5. The process according to claim 1, wherein the electron donor is selected from the group consisting of methanol, ethanol and tetrahydrofuran.

6. A process for the production of a magnesium chloride and titanium chloride based powder catalyst with steps comprising:

(a) providing a plasma field;

(b) introducing magnesium chloride into said plasma field;

(c) introducing titanium chloride into said plasma field concomitantly with said magnesium chloride;

(d) introducing an electron donor into said plasma field concomitantly with said magnesium chloride and said titanium chloride; and (e) withdrawing a reaction product of said electron donor, magnesium chloride and titanium chloride from said plasma field, cooling said reaction product and collecting a magnesium chloride and titanium chloride based powder catalyst after cooling of said reaction product.

7. The process of claim 6 wherein said electron donor is selected from the group consisting of ethers, alcohols, benzoates, and phthalates.

8. The process of claim 7 wherein said electron donors selected from the group consisting of methanol, ethanol, tetrahydroforan, ethylbenzate, and di-butylphthalate.

9. The process of claim 8 wherein titanium chloride is selected from the group consisting of titanium tetrachloride and titanium trichloride.

10. The process of claim 6 wherein the said magnesium chloride and said titanium chloride are introduced into said plasma field in a suspension or solution in said electron donor.

11. The method of claim 6 wherein said magnesium chloride and said titanium chloride are introduced into said plasma field in a solution of an electron donor selected from the group consisting of methanol, ethanol and tetrahydroforan.

* * * * *